US008602663B2

(12) United States Patent
Kanda

(10) Patent No.: US 8,602,663 B2
(45) Date of Patent: Dec. 10, 2013

(54) LIGHT AMOUNT ADJUSTMENT DEVICE FOR IMAGE PICKUP APPARATUS

(75) Inventor: Akihiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/486,337

(22) Filed: Jun. 1, 2012

(65) Prior Publication Data
US 2012/0315028 A1 Dec. 13, 2012

(30) Foreign Application Priority Data

Jun. 10, 2011 (JP) ................................. 2011-130116

(51) Int. Cl.
*G03B 9/08* (2006.01)
(52) U.S. Cl.
USPC .......................................................... 396/449
(58) Field of Classification Search
USPC ................................................. 396/449–451
See application file for complete search history.

(56) References Cited

U.S. PATENT DOCUMENTS 6,585,429 B2 * 7/2003 Yaginuma et al. ............ 396/458
2002/0197077 A1 * 12/2002 Eguro ........................... 396/451
2010/0272429 A1 * 10/2010 Koo ............................... 396/449

FOREIGN PATENT DOCUMENTS

JP 2001-117135 4/2001

* cited by examiner

*Primary Examiner* — Clayton E Laballe
*Assistant Examiner* — Dennis Hancock
(74) *Attorney, Agent, or Firm* — Cowan, Liebowitz & Latman, P.C.

(57) ABSTRACT

A light amount adjustment device capable of operating shutter blades and a light amount adjustment member by a common drive source, while preventing light incident through an aperture from being momentarily interrupted by the shutter blades when the light amount adjustment member advances to and retreats from the aperture. After a drive member's cam shaft is moved by an energized actuator to a position where an ND filter advances to the aperture, the actuator is deenergized and the cam shaft is moved by a spring force to a position where the ND filter advances to the aperture. After the cam shaft is moved to a final position by the energized actuator, the actuator is deenergized and the cam shaft is moved by the spring force to a position where the ND filter retreats from the aperture. During this time, the shutter blades open and close on outside of the aperture.

14 Claims, 9 Drawing Sheets

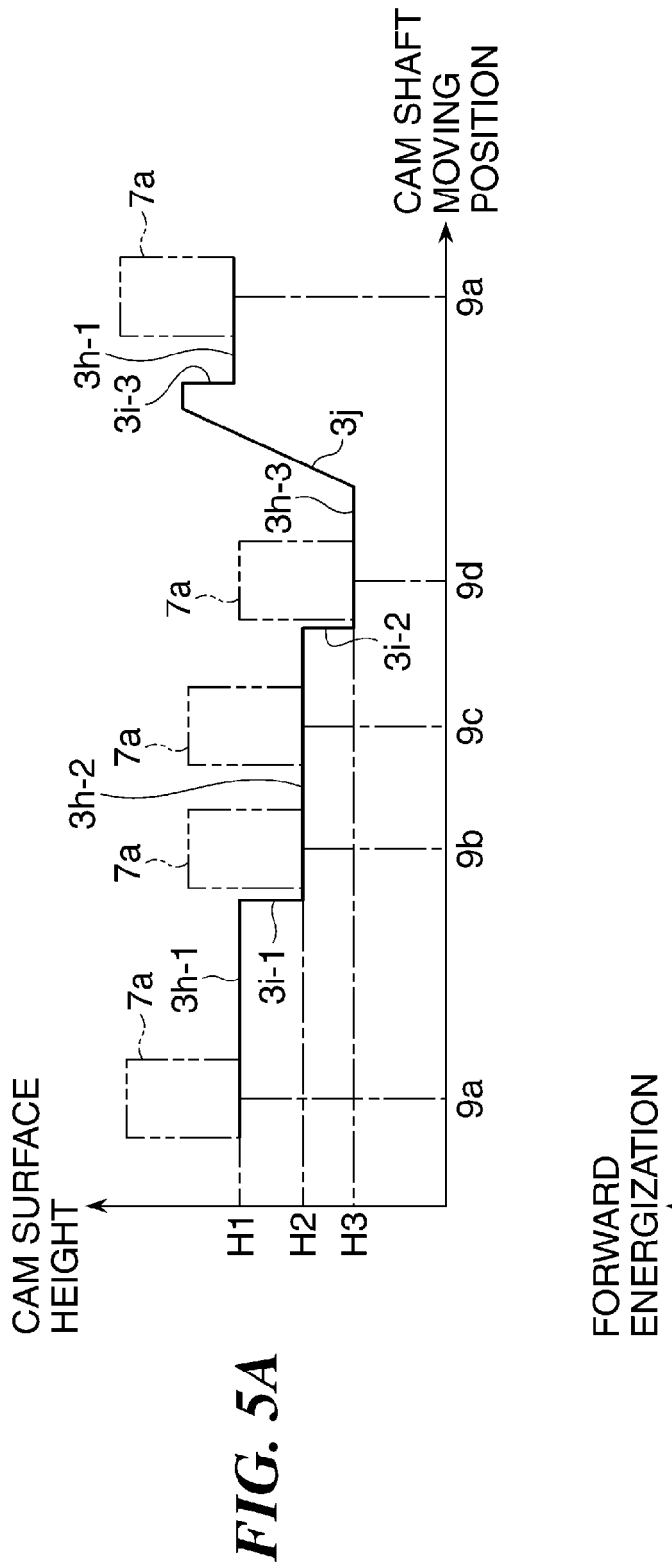
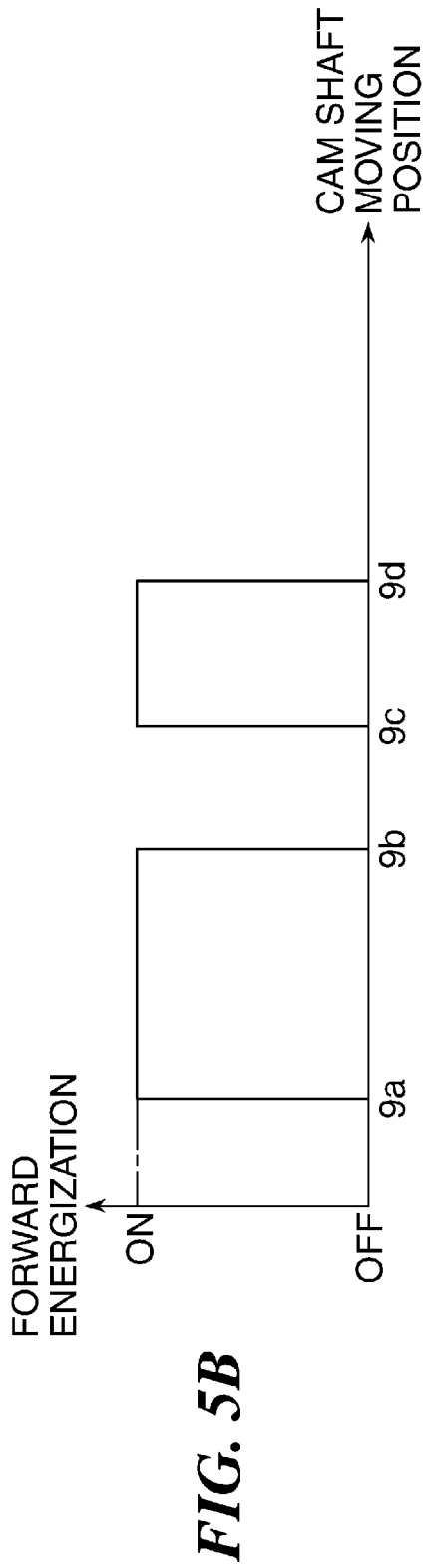

LIGHT AMOUNT ADJUSTMENT DEVICE FOR IMAGE PICKUP APPARATUS

BACKGROUND OF THE INVENTION

1. Field of the Invention

The present invention relates to a light amount adjustment device mounted to, e.g., a lens barrel of an image pickup apparatus such as a digital camera.

2. Description of the Related Art

In a light amount adjustment device mounted to a lens barrel of an image pickup apparatus such as a digital camera, there are sometimes provided shutter blades for opening/closing an exposure aperture and a diaphragm blade for narrowing the exposure aperture. If electromagnetic drive sources are provided independently for the shutter blades and for the diaphragm blade, the resultant device becomes high in cost and large in size, weight, and power consumption, which poses a problem.

A light amount adjustment device shown in FIG. 14 has therefore been proposed, in which shutter blades and a diaphragm blade are driven by a common electromagnetic drive source (see, Japanese Laid-open Patent Publication No. 2001-117135 and corresponding U.S. Patent Publication No. 6,903,777).

The proposed light amount adjustment device (digital camera shutter) includes a motor (electromagnetic drive source) that has a coil and a rotor 104 having a two-pole magnet. The rotor 104 rotates in a direction corresponding to the direction of coil energization. With clockwise rotation of the rotor 104, shutter blades 118, 119 are rotated by a driving pin 104b of the rotor in directions to open an aperture 101a formed in a shutter base plate 101. With anticlockwise rotation of the rotor 104, the shutter blades 118, 119 are rotated in directions to close the aperture 101a.

The light amount adjustment device also includes a diaphragm blade 120 formed with an aperture 120a, and a diaphragm actuating member 115 coupled to the diaphragm blade 120. The diaphragm actuating member 115 is coupled to the driving pin 104b of the rotor 104 via a spring 116 and to the shutter base plate 101 via a spring 117, and is urged by the spring 117 in such a manner that an engaging portion 115a of the diaphragm actuating member 115 is brought in contact with the driving pin 104b.

When the rotor 104 rotates clockwise, the diaphragm actuating member 115 is rotated anticlockwise by the urging forces of the springs 116, 117, so that the aperture 102a of the diaphragm blade 120 is disposed to face the aperture 101a of the shutter base plate 101. Subsequently, when the diaphragm actuating member 115 is rotated clockwise by the driving pin 104b of the rotor 104, the diaphragm blade 120 returns to the state shown in FIG. 14.

In a state that the coil is not energized and the aperture 101a is fully opened or it is closed, the rotor 104 is kept stopped by a holding force generated by magnetic holding means (not shown). In a state that the coil is not energized and a small-diameter aperture is defined by the diaphragm blade 120, the rotor 104 is kept stopped by the engaging portion 115a of the diaphragm actuating member 115 and the spring 116.

With the device disclosed in Japanese Laid-open Patent Publication No. 2001-117135, however, even when only the diaphragm blade 120 should be opened and closed, the shutter blades 118, 119 are opened and closed. This results in a problem that light incident through the aperture 101a is interrupted momentarily.

SUMMARY OF THE INVENTION

The present invention provides a light amount adjustment device capable of operating shutter blades and a light amount adjustment member by a common electromagnetic drive source, while preventing light incident through an aperture from being momentarily interrupted by an open/close operation of the shutter blades when the light amount adjustment member advances to and retreats from the aperture.

According to one aspect of this invention, there is provided a light amount adjustment device comprising an actuator having a rotary shaft that forwardly or reversely rotates according to forward or reverse energization of the actuator, a shutter base plate having an exposure aperture, the shutter base plate being formed with a cam groove having a cam surface, shutter blades configured to be rotatably supported by the shutter base plate and configured to open and close the exposure aperture, a light amount adjustment member configured to be rotatably supported by the shutter base plate and configured to advance to and retreat from the exposure aperture, a shutter blade drive member having a proximal end to which the rotary shaft of the actuator is fixed and having a tip end provided with a drive shaft extending parallel to the rotary shaft and configured to be engaged with the shutter blades, the shutter blade drive member being configured to rotate with rotation of the rotary shaft of the actuator, thereby rotating the shutter blades in directions to open and close the exposure aperture, a light amount adjustment member drive member having an engaging portion with which the drive shaft of the shutter blade drive member is slidably engaged and having a cam shaft configured to be slidably engaged with the light amount adjustment member and to abut in an optical axis direction against the cam surface of the cam groove formed in the shutter base plate, and an urging member configured to urge the light amount adjustment member drive member in such a manner that the light amount adjustment member retreats from the exposure aperture of the shutter base plate and that the cam shaft of the light amount adjustment member drive member abuts against the cam surface of the cam groove, wherein the forward energization of the actuator is performed in a state where the cam shaft of the light amount adjustment member drive member is located at a first position on the cam surface, so that the cam shaft is moved from the first position to a second position on the cam surface, whereby the light amount adjustment member is rotated in a direction to advance to the exposure aperture, wherein the forward energization of the actuator is stopped in a state where the cam shaft is located at the second position, so that the cam shaft is moved from the second position to a third position on the cam surface by an urging force of the urging member, whereby the light amount adjustment member is maintained in a state where it advances to the exposure aperture, wherein the forward energization of the actuator is performed in a state where the cam shaft of the light amount adjustment member drive member is located at the third position, so that the cam shaft is moved from the third position to a fourth position on the cam surface, whereby the light amount adjustment member is rotated, wherein the forward energization of the actuator is stopped in a state where the cam shaft is located at the fourth position, so that the cam shaft is moved from the fourth position to the first position on the cam surface by the urging force of the urging member, whereby the light amount adjustment member is rotated in a direction to retreat from the exposure aperture, and wherein the shutter blades are rotated in directions to close the exposure aperture when the reverse energization of the actuator is performed.

With this invention, the shutter blades and the light amount adjustment member of the light amount adjustment device can be operated by the common electromagnetic drive source, while preventing light incident through the aperture from being momentarily interrupted by an open/close operation of the shutter blades when the light amount adjustment member advances to and retreats from the aperture.

Further features of the present invention will become apparent from the following description of an exemplary embodiment with reference to the attached drawings.

BRIEF DESCRIPTION OF THE DRAWINGS

FIG. 5A is a graph showing a relation between the height of a cam surface of the heart cam groove and the moving position of a cam shaft of an ND filter drive member on the cam surface of the heart cam groove;

FIG. 5B is a graph showing a relation between an ON/OFF state of forward energization of an actuator of the light amount adjustment device and the moving position of the cam shaft on the cam surface of the heart cam groove;

FIG. 6 shows an open state of the ND filter in which a cam shaft of the ND filter drive member is located at a first position on the cam surface of the heart cam groove, FIG. 7 shows a state where the cam shaft stops at a second position on the cam surface, FIG. 8 shows a state where the cam shaft stops at a third position on the cam surface, and FIG. 9 shows a state where the cam shaft stops at a fourth position on the cam surface;

FIG. 10 shows a state where the shutter blades open the aperture formed in the shutter base plate in a state that the ND filter retreats from the aperture, FIG. 11 shows a state where the shutter blades close the aperture in a state that the ND filter retreats from the aperture, FIG. 12 shows a state where the shutter blades are open in a state that the ND filter advances to the aperture, and FIG. 13 shows a state where the shutter blades are closed in a state that the ND filter advances to the aperture.

DESCRIPTION OF THE EMBODIMENTS

The present invention will now be described in detail below with reference to the drawings showing a preferred embodiment thereof.

Figures 1, 2:
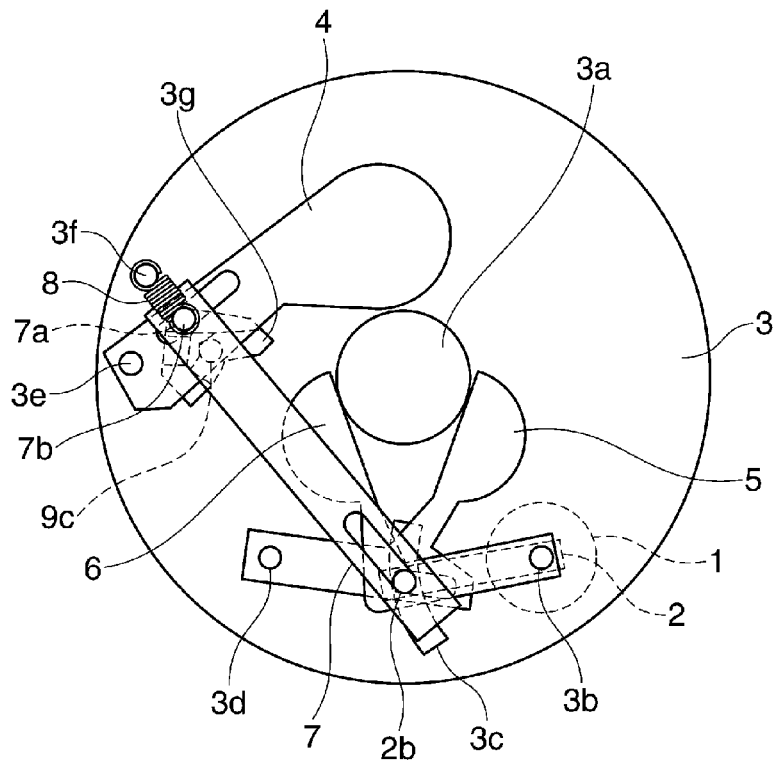
FIG. 1 is a plan view showing a light amount adjustment device according to one embodiment of this invention.
FIG. 2 is an exploded perspective view of the light amount adjustment device.
Figure 3:
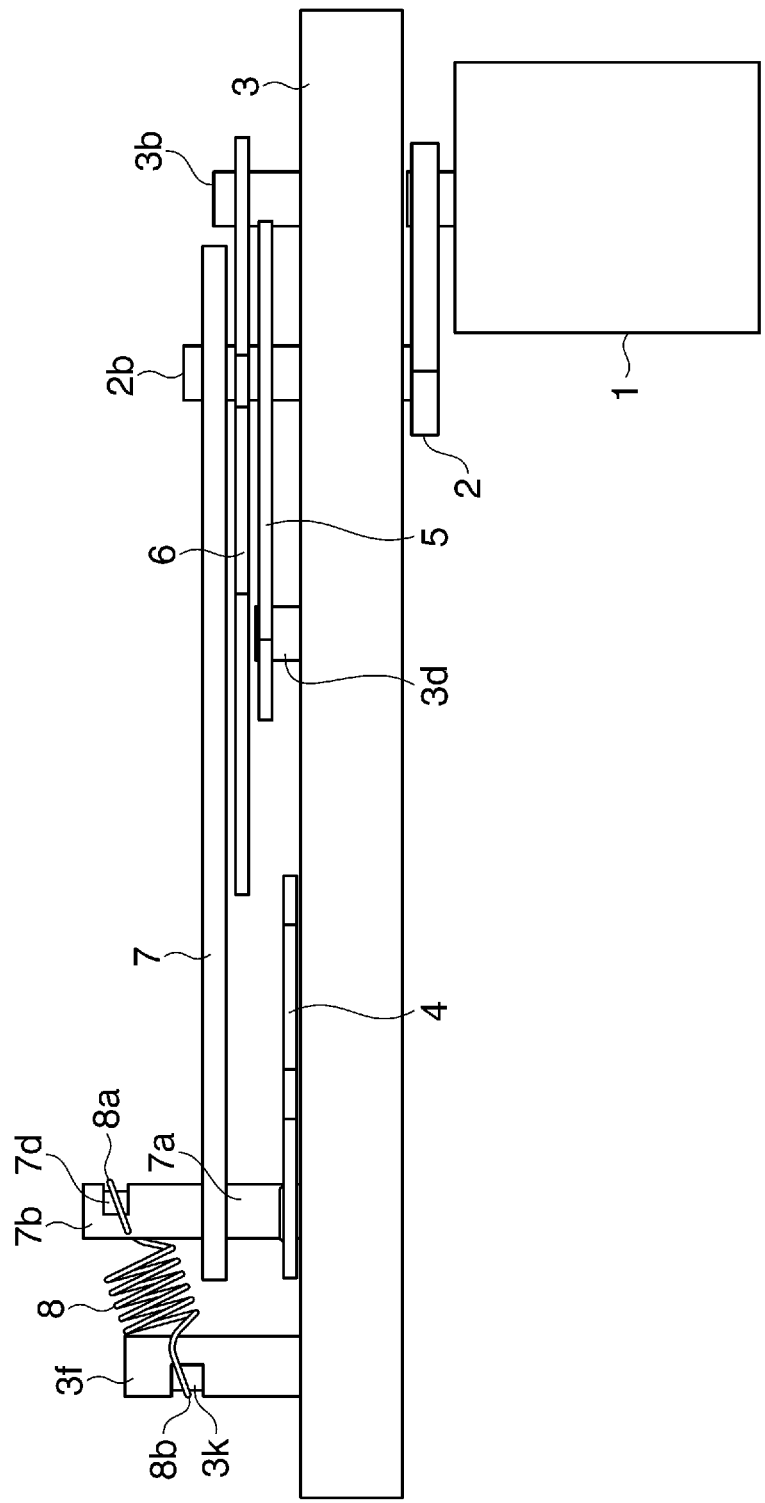
FIG. 3 is a side view of the light amount adjustment device.

FIGS. 1 to 3 show a light amount adjustment device according to one embodiment in plan view, in exploded perspective view, and in side view, respectively.

As shown in FIGS. 1 to 3, the light amount adjustment device of this embodiment includes an actuator 1 that functions as an electromagnetic drive source, a shutter base plate 3, an ND filter 4 that functions as a light amount adjustment member, an ND filter drive member 7 that functions as a light amount adjustment member drive member, shutter blades 5, 6, a shutter blade drive member 2, and a spring member 8.

The actuator 1 has a rotary shaft 1a that forwardly or reversely rotates according to forward or reverse energization of the actuator 1.

The shutter blade drive member 2 is formed into a rectangular plate long in length in the diametrical direction of the actuator 1, and formed at its longitudinal proximal end with a hole 2a to which the rotary shaft 1a of the actuator 1 is fitted and fixed. With rotation of the rotary shaft 1a, the shutter blade drive member 2 rotates.

The shutter blade drive member 2 is formed at its longitudinal tip end with a drive shaft 2b that extends parallel to the rotary shaft 1a of the actuator 1. The drive shaft 2b is inserted through and engaged with an arcuate hole 3c and elongated holes 5b, 6b, and 7c. The arcuate hole 3c is formed in the shutter base plate 3, the elongated holes 5b, 6b are respectively formed in the shutter blades 5, 6, and the elongated hole 7c is formed in the ND filter drive member 7.

The shutter base plate 3 is made of, e.g., a synthetic resin material, and has a central exposure aperture 3a. The shutter base plate 3 is formed with a shaft portion 3b which is engaged with a hole 6a formed in the shutter blade 6, and the above-described arcuate hole 3c with which the drive shaft 2b of the shutter blade drive member 2 is slidably engaged.

The shutter base plate 3 is formed with shaft portions 3d, 3e, and 3f that are respectively engaged with a hole 5a formed in the shutter blade 5, a hole 4a formed in the ND filter 4, and a hook portion 8b of the spring member 8. The shaft portion 3f has a peripheral surface formed with a groove portion 3k to which the hook portion 8b of the spring member 8 is hooked. The shutter base plate 3 is further formed with a bottomed heart cam groove 3g whose bottom surface (hereinafter referred to as the cam surface) is formed by a plurality of cam surfaces.

Figure 4:
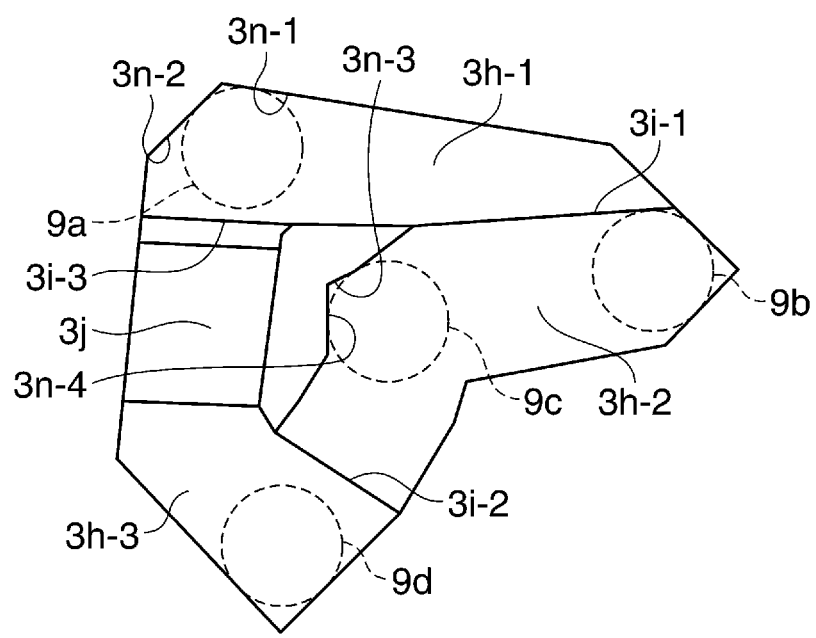
FIG. 4 is a view showing a bottomed heart cam groove formed in a shutter base plate of the light amount adjustment device.

FIG. 4 shows the heart cam groove 3g in plan view, and FIG. 5A shows in graph a relation between the height of the cam surface of the heart cam groove 3g and the moving position of a cam shaft of the ND filter drive member 7 on the cam surface of the heart cam groove 3g.

As shown in FIGS. 4 and 5A, the heart cam groove 3g has three planer cam surfaces 3h-1, 3h-2, and 3h-3 having different heights in the optical axis direction. In FIG. 5A, symbols H1, H2, and H3 represent the heights of the cam surfaces 3h-1, 3h-2, and 3h-3, respectively. There is a step 3i-1 between the cam surface 3h-1 and the cam surface 3h-2 which is lower in height than the cam surface 3h-1, and there is a step 3i-2 between the cam surface 3h-2 and the cam surface 3h-3 which is lower in height than the cam surface 3h-2. In other words, among the three cam surfaces 3h-1, 3h-2, and 3h-3, the cam surface 3h-1 is located at the highest position and the cam surface 3h-3 is located at the lowest position. The cam surface 3h-3 is connected to the cam surface 3h-1 through a slanted cam surface 3j and a step 3i-3.

In FIGS. 4 and 5A, reference numerals 9a to 9d represent moving positions of a cam shaft 7a of the ND filter drive member 7 on the cam surface of the heart cam groove 3g.

Referring to FIGS. 1 to 3 again, the ND filter 4 is formed with the above-described hole 4a with which the shaft portion 3e of the shutter base plate 3 is engaged, and an elongated hole 4b with which the cam shaft 7a formed on the ND filter drive member 7 is slidably engaged.

As previously described, the shutter blade 5 is formed with the hole 5a with which the shaft portion 3d of the shutter base plate 3 is engaged and the elongated hole 5b with which the drive shaft 2b of the shutter blade drive member 2 is slidably engaged. As previously described, the shutter blade 6 is formed with the hole 6a with which the shaft portion 3b of the shutter base plate 3 is engaged and the hole 6b with which the drive shaft 2b of the shutter blade drive member 2 is engaged.

When the shutter blade drive member 2 rotates with rotation of the rotary shaft 1a of the actuator 1, the shutter blades 5, 6 rotate in direction to open and close the aperture 3a of the shutter base plate 3, whereby light amount adjustment is performed.

The ND filter drive member 7 is formed into a rectangular plate, and has the above-described cam shaft 7a whose bottom surface (tip end surface) is engaged with the cam surface of the heart cam groove 3g of the shutter base plate 3, and a shaft portion 7b that projects in a direction opposite from the cam shaft 7a. The shaft portion 7b has a circumferential surface formed with a groove portion 7d to which the hook portion 8a of the spring member 8 is hooked. The ND filter drive member 7 is also formed with the above-described elongated hole 7c with which the drive shaft 2b of the shutter blade drive member 2 is slidably engaged. The elongated hole 7c is an example of an engaging portion of this invention.

When the shutter blade drive member 2 rotates with rotation of the rotary shaft 1a of the actuator 1, the ND filter drive member 7 is driven by the shutter blade drive member 2, so that the ND filter 4 is rotated by the ND filter drive member 7 in directions to open and close the aperture 3a of the shutter base plate 3, whereby light amount adjustment is performed.

The spring member 8 of this embodiment is formed by an extension coil spring. As previously described, the spring member 8 has the hook portion 8a which is hooked to the groove portion 7d of the shaft portion 7b of the ND filter drive member 7 and the hook portion 8b which is hooked to the groove portion 3k of the shaft portion 3f of the shutter base plate 3.

As shown in FIG. 3, the spring member 8 is obliquely disposed in such a manner that a hook position where the hook portion 8a of the spring member 8 is hooked to the groove portion 7d of the shaft portion 7b of the ND filter drive member 7 is much further away from the shutter base plate 3 in the optical axis direction than a hook position where the hook portion 8b of the spring member 8 is hooked to the groove portion 3k of the shaft portion 3f of the shutter base plate 3. As a result, the ND filter drive member 7 is urged by the spring member 8 in a direction in which the ND filter 4 retreats from the aperture 3a of the shutter base plate 3 and in a direction in which the tip end surface of the cam shaft 7a abuts against the cam surface of the heart cam groove 3g of the shutter base plate 3.

Next, a description will be given of an open/close operation of the ND filter 4. FIG. 5B shows in graph a relation between an ON/OFF state of forward energization of the actuator 1 and the moving position of the cam shaft 7a of the ND filter drive member 7 on the cam surface of the heart cam groove 3g. FIGS. 6 to 9 show an open/close operation of the ND filter 4.

First, a close operation of the ND filter 4 is described. In a case where the ND filter 4 is in an open state shown in FIG. 6, the energization of the actuator 1 is turned off, and the cam shaft 7a of the ND filter drive member 7 is stopped at the position 9a on the cam surface 3h-1 of the heart cam groove 3g (FIGS. 4 and 5A) by an urging force of the spring member 8, while abutting against side surfaces 3n-1, 3n-2 of the heart cam groove 3g. As a result, the ND filter drive member 7 and the shutter blade drive member 2 are each restricted from moving in a direction perpendicular to the optical axis, so that the ND filter 4 and the shutter blades 5, 6 are each maintained in the open state. The stop position 9a of the cam shaft 7a is an example of a first position in this invention.

Figure 6:
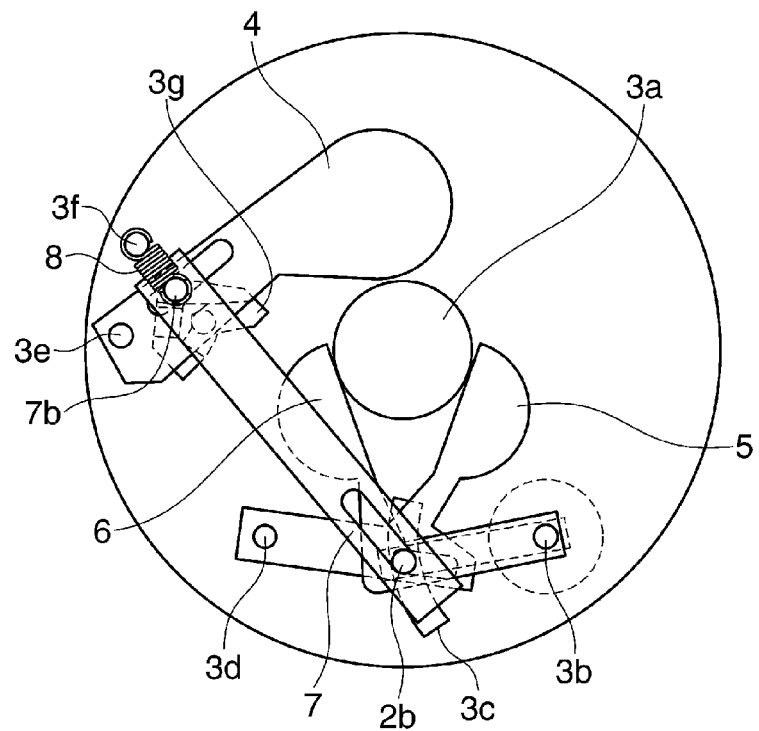
FIGS. 6 to 9 are views for explaining an open/close operation of an ND filter of the light amount adjustment device in which the ND filter advances to and retreats from an aperture formed in the shutter base plate, where

When the forward energization of the actuator 1 is turned on (see FIG. 5B), the rotary shaft 1a of the actuator 1 rotates anticlockwise in FIG. 6. With the rotation of the rotary shaft 1a, the shutter blade drive member 2 rotates anticlockwise, and the camshaft 7a of the ND filter drive member 7 whose elongated hole 7c is engaged with the drive shaft 2b of the shutter blade drive member 2 moves along the cam surface 3h-1 of the heart cam groove 3g against the urging force of the spring member 8 (see FIGS. 4 and 5A).

Figure 7:
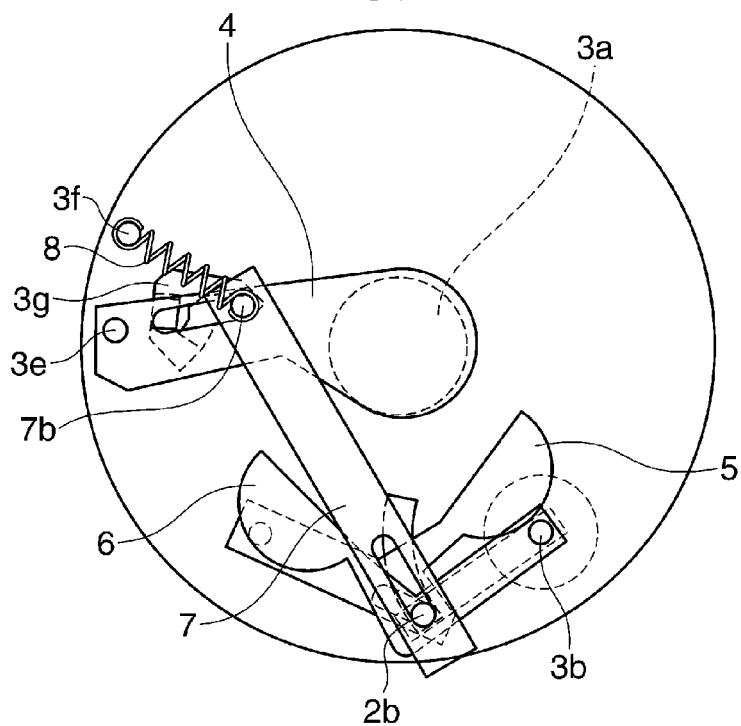

When the camshaft 7a moves beyond the step 3i-1, the camshaft 7a stops at the position 9b on the cam surface 3h-2, whereby a state shown in FIG. 7 is reached. The position 9b is an example of a second position in this invention.

Figure 8:
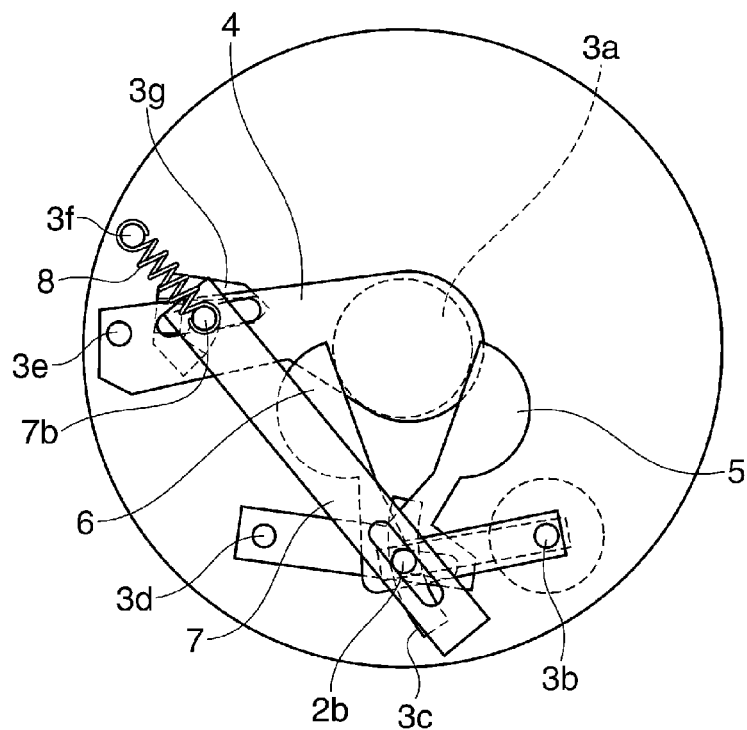

When the energization of the actuator 1 is turned off (see FIG. 5B), the cam shaft 7a moves along the cam surface 3h-2 by being applied with the urging force of the spring member 8, and stops at the position 9c while abutting against side surfaces 3n-3, 3n-4 of the heart cam groove 3g, whereby a state shown in FIG. 8 is reached. The stop position 9c is an example of a third position in this invention.

As described above, the cam shaft 7a engaged with the elongated hole 4b of the ND filter 4 moves from the position 9a to the position 9b and to the position 9c in the heart cam groove 3g. With this movement of the cam shaft 7a, the ND filter 4 rotates clockwise about the hole 4a, into which the shaft portion 3e of the shutter base plate 3 is fitted. The ND filter 4 advances to the aperture 3a and is held there. When the cam shaft 7a moves from the position 9a to the position 9c, the shutter blades 5, 6 perform open and close operations on the outside of the aperture 3a.

Next, an open operation of the ND filter 4 is described. In a case where the ND filter 4 is in a closed state, the cam shaft 7a of the ND filter drive member 7 is brought in contact with the side surfaces 3n-3, 3n-4 of the heart cam groove 3g of the shutter base plate 3 by the urging force of the spring member 8, and is held at the third position 9c.

In the closed state of the ND filter 4, when the forward energization of the actuator 1 is turned on (see FIG. 5B), the shutter blade drive member 2 moves anticlockwise in FIG. 8, and the cam shaft 7a of the ND filter drive member 7 whose elongated hole 7c is engaged with the drive shaft 2b of the shutter blade drive member 2 moves along the cam surface 3h-2 of the heart cam groove 3g against the urging force of the spring member 8 (see FIGS. 4 and 5A).

Figure 9:
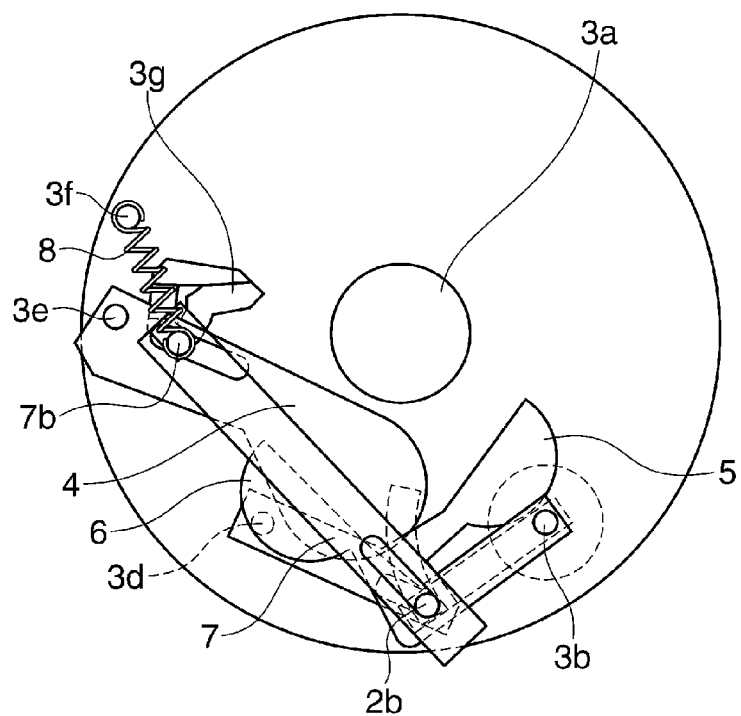

When the cam shaft 7a moves beyond the step 3i-2, the cam shaft 7a stops at the position 9d on the cam surface 3h-3, so that a state shown in FIG. 9 is reached. The position 9d is an example of a fourth position in this invention.

When the energization of the actuator 1 is turned off, the cam shaft 7a is moved along the cam surface 3h-3 and the slanted cam surface 3j by the urging force of the spring member 8. When the cam shaft 7a moves beyond the step 3i-3, the cam shaft 7a stops at the position 9a of the cam surface 3h-1, whereby a state shown in FIG. 6 is reached. At that time, as described above, the cam shaft 7a is brought in contact with and held by the side surfaces 3n-1, 3n-2 of the heart cam groove 3g by the urging force of the spring member 8.

As described above, the cam shaft 7a of the ND filter drive member 7 whose elongated hole 7c is engaged with the drive shaft 2b of the shutter blade drive member 2 moves from the third position 9c to the fourth position 9d and to the first position 9a on the cam surface of the heart cam groove 3g. As a result, the ND filter 4 rotates anticlockwise about the hole 4a into which the shaft portion 3e of the shutter base plate 3 is fitted, so that the ND filter 4 retreats from the aperture 3a of the shutter base plate 3. When the cam shaft 7a moves from the third position 9c to the first position 9a, the shutter blades 5, 6 perform open and close operations on the outside of the aperture 3a.

Next, an operation of the shutter blades 5, 6 for opening and closing the aperture 3a of the shutter base plate 3 will be described. FIGS. 10 to 13 show an open/close operation of the shutter blades 5, 6.

First, a description will be given of an operation of the shutter blade 5, 6 to close the aperture 3a performed in a state where the ND filter 4 retreats from the aperture 3a of the shutter base plate 3. When reverse energization of the actuator 1 is turned on in a state shown in FIG. 10 where the shutter blades 5, 6 open the aperture 3a, the shutter blade drive member 2 rotates clockwise with rotation of the rotary shaft 1a of the actuator 1.

Figure 11:
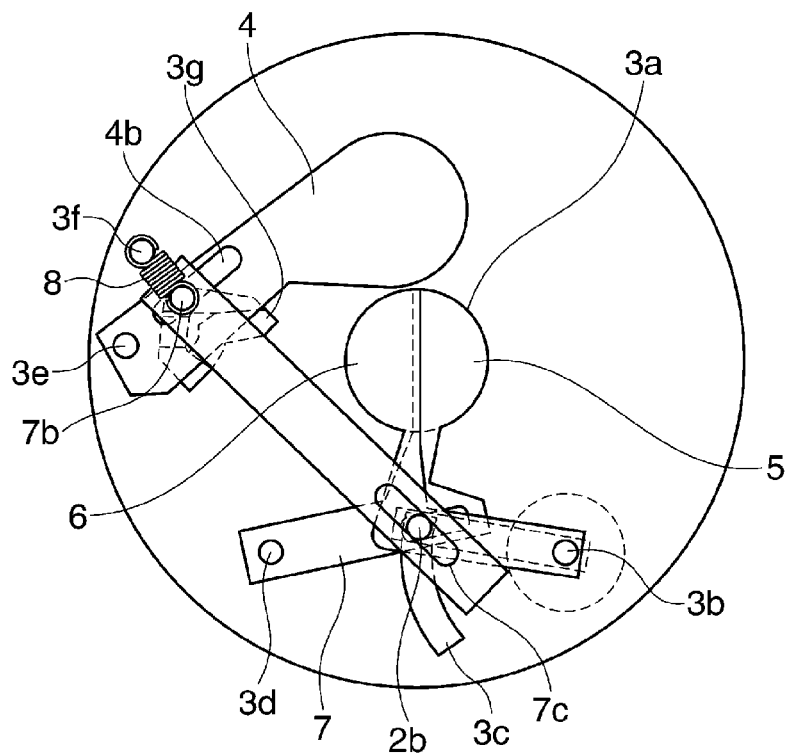
Figure 12:
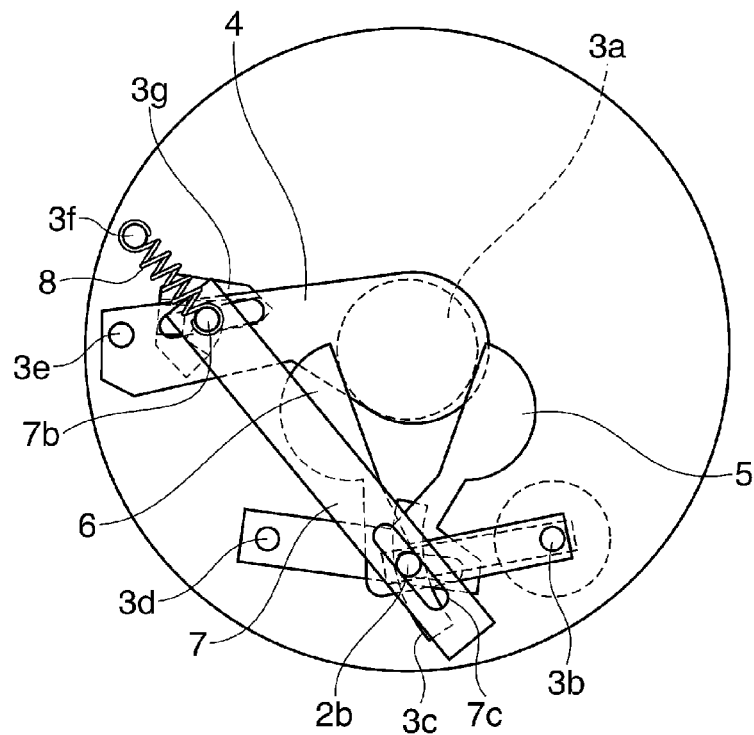
Figure 13:
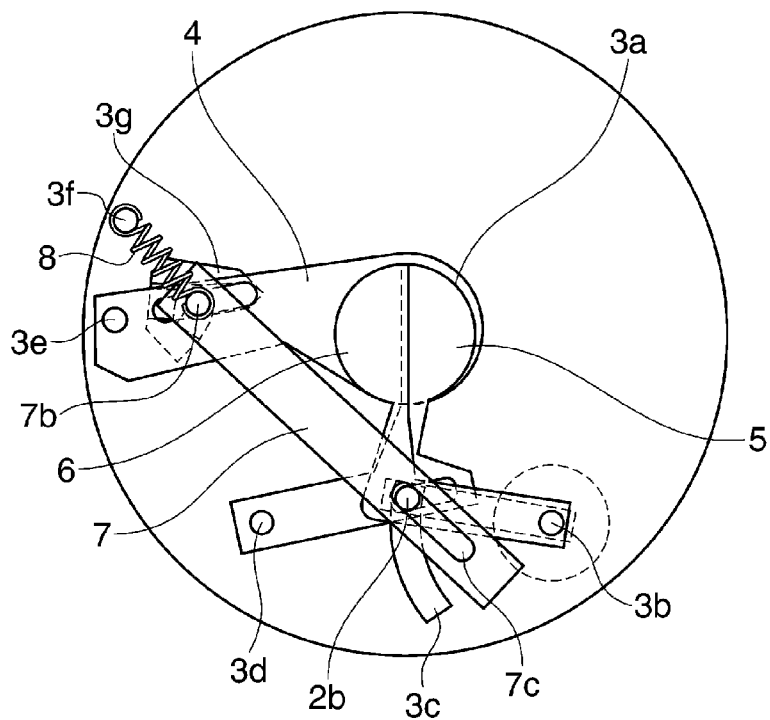
Figure 14:
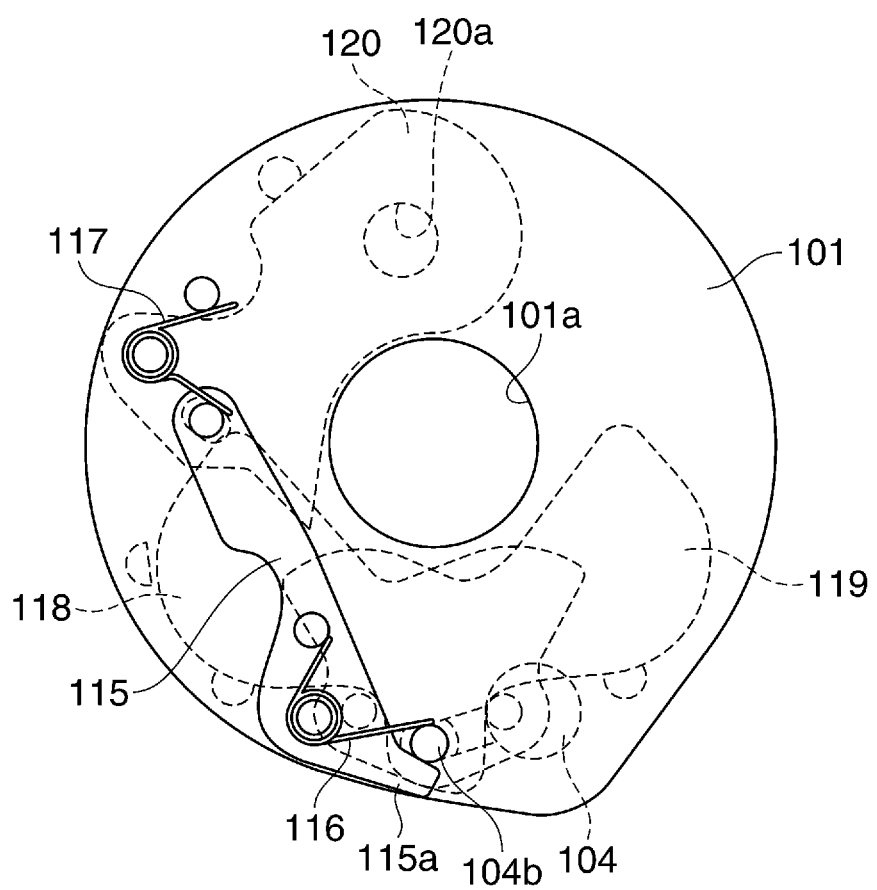
FIG. 14 is a plan view of a prior art light amount adjustment device.

Since the drive shaft 2b of the shutter blade drive member 2 is engaged with the elongated holes 5b, 6b of the shutter blades 5, 6 as previously described, the shutter blades 5, 6 rotate about the elongated holes 5a, 6a, respectively, in directions to come close to each other with the clockwise rotation of the shutter blade drive member 2, so that a state shown in FIG. 11 is reached.

When the shutter blades 5, 6 operate to close the aperture 3a, the ND filter drive member 7 rotates anticlockwise about the cam shaft 7a in a state where the cam shaft 7a is held at the position 9a on the cam surface 3h-1 of the heart cam groove 3g by the urging force of the spring member 8 acting in the optical axis direction. Thus, when the shutter blades 5, 6 operate to close the aperture 3a, the ND filter 4 does not advance to and retreat from the aperture 3a.

Next, a description will be given of an operation of the shutter blades 5, 6 for opening the aperture 3a of the shutter base plate 3. In the state shown in FIG. 11, the forward energization of the actuator 1 is turned on. At that time, the amount of energization (power supply) is controlled such that the driving force of the actuator 1 becomes smaller than the urging force of the spring member 8.

Figure 10:
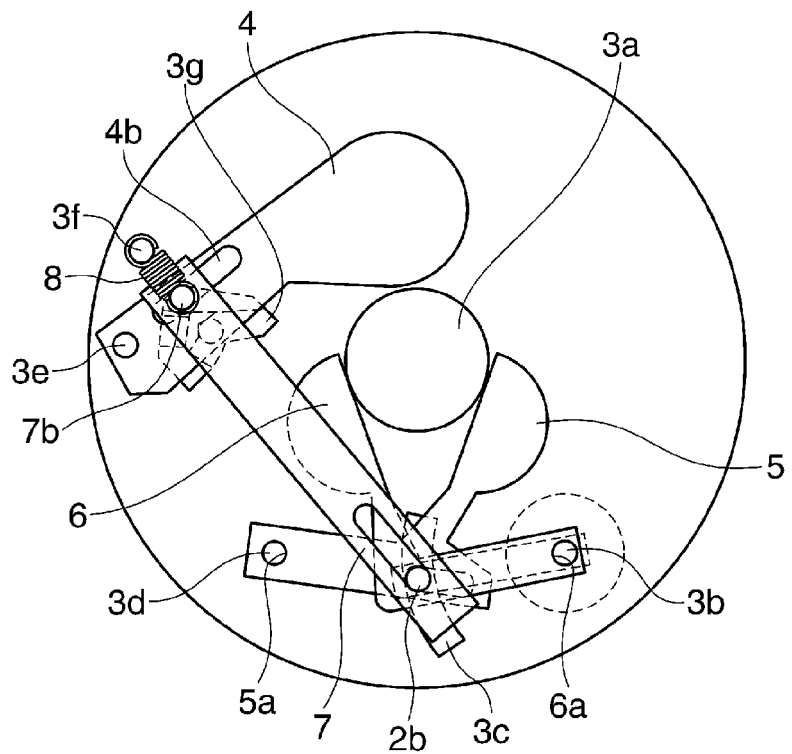
FIGS. 10 to 13 are views for explaining an open/close operation of shutter blades, where

With the forward energization of the actuator 1, the drive shaft 2b of the shutter blade drive member 2 engaged with the elongated hole 7c of the ND filter drive member 7 rotates anticlockwise in a state where the cam shaft 7a is held at the first position 9a on the cam surface 3h-1 of the heart cam groove 3g, i.e., in a state where the ND filter 4 retreats from the aperture 3a of the shutter base plate 3. As a result, the shutter blades 5, 6 engaged with the drive shaft 2b of the shutter blade drive member 2 rotate about the holes 5a, 6a in directions to open apart from each other to thereby open the aperture 3a, whereby the state shown in FIG. 10 is reached.

Then, the energization of the actuator 1 is turned off, the rotary shaft 1a of the actuator 1 stops rotating, and accordingly, the drive shaft 2b of the shutter blade drive member 2 stops rotating, whereby the shutter blades 5, 6 are maintained in the state to open the aperture 3a.

It should be noted that a close operation of the shutter blades 5, 6 from an open state (FIG. 12) to a closed state (FIG. 13) and an open operation of the shutter blades 5, 6 from the closed state to the open state which are performed in a state where the ND filter 4 advances to the aperture 3a of the shutter base plate 3 are the same as the above-described close and open operations of the shutter blades 5, 6 performed in a state where the ND filter 4 retreats from the aperture 3a, and therefore a description thereof is omitted herein.

As described above, according to this embodiment, the shutter blades 5, 6 and the ND filter 4 (light amount adjustment member) of the light amount adjustment device can be operated by the common actuator 1 (common electromagnetic drive source), while preventing light incident through the aperture 3a of the shutter base plate 3 from being momentarily interrupted by the open and close operation of the shutter blades 5, 6 when the ND filter 4 advances to and retreats from the aperture 3a.

In the above-described embodiment, a case where the ND filter 4 is used as the light amount adjustment member has been described. However, a turret aperture plate or the like can be used instead of the ND filter 4.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-130116, filed Jun. 10, 2011, which is hereby incorporated by reference herein in its entirety.

What is claimed is:

1. A light amount adjustment device, comprising:
an actuator having a rotary shaft that forwardly or reversely rotates according to forward or reverse energization of said actuator;
a shutter base plate having an exposure aperture, said shutter base plate being formed with a cam groove having a cam surface;
shutter blades configured to be rotatably supported by said shutter base plate and configured to open and close the exposure aperture;
a light amount adjustment member configured to be rotatably supported by said shutter base plate and configured to advance to and retreat from the exposure aperture;
a shutter blade drive member having a proximal end to which the rotary shaft of said actuator is fixed and having a tip end provided with a drive shaft extending parallel to the rotary shaft and configured to be engaged with said shutter blades, said shutter blade drive member being configured to rotate with rotation of the rotary shaft of said actuator, thereby rotating said shutter blades in directions to open and close the exposure aperture;
a light amount adjustment member drive member having an engaging portion with which the drive shaft of said shutter blade drive member is slidably engaged and having a cam shaft configured to be slidably engaged with said light amount adjustment member and to abut in an optical axis direction against the cam surface of the cam groove formed in said shutter base plate; and
an urging member configured to urge said light amount adjustment member drive member in such a manner that said light amount adjustment member retreats from the exposure aperture of said shutter base plate and that the camshaft of said light amount adjustment member drive member abuts against the cam surface of the cam groove,
wherein the forward energization of said actuator is performed in a state where the cam shaft of said light amount adjustment member drive member is located at a first position on the cam surface, so that the camshaft is moved from the first position to a second position on the cam surface, whereby said light amount adjustment member is rotated in a direction to advance to the exposure aperture,
wherein the forward energization of said actuator is stopped in a state where the cam shaft is located at the second position, so that the cam shaft is moved from the second position to a third position on the cam surface by an urging force of said urging member, whereby said light amount adjustment member is maintained in a state where it advances to the exposure aperture, wherein the forward energization of said actuator is performed in a state where the cam shaft of said light amount adjustment member drive member is located at the third position, so that the cam shaft is moved from the third position to a fourth position on the cam surface, whereby said light amount adjustment member is rotated, wherein the forward energization of said actuator is stopped in a state where the cam shaft is located at the fourth position, so that the cam shaft is moved from the fourth position to the first position on the cam surface by the urging force of said urging member, whereby said light amount adjustment member is rotated in a direction to retreat from the exposure aperture, and wherein said shutter blades are rotated in directions to close the exposure aperture when the reverse energization of said actuator is performed.

2. The light amount adjustment device according to claim 1, wherein the cam groove formed in said shutter base plate is a heart cam groove.

3. The light amount adjustment device according to claim 2, wherein the heart cam groove has three planer cam surfaces having different heights in the optical axis direction and a slanted cam surface through which one of the three planer cam surfaces which has highest height is connected to another one of the three planer cam surface which has lowest height.

4. The light amount adjustment device according to claim 3, wherein the first position is on the one of the three planer cam surfaces which has highest height, the fourth position is on the another one of the three planer cam surfaces which has lowest height, and the second position and the third position are on the last one of the three planer cam surfaces.

5. The light amount adjustment device according to claim 4, wherein there is a first step between the one of the three planer cam surfaces which has highest height and the last one of the three planer cam surfaces, and there is a second step between the another one of the three planer cam surfaces which has lowest height and the last one of the three planer cam surfaces.

6. The light amount adjustment device according to claim 5, wherein the first step and the second step is perpendicular to the shutter base plate.

7. The light amount adjustment device according to claim 1, wherein said urging member is an extension coil spring that is hooked to said light amount adjustment member drive member and to said shutter base plate, and the extension coil spring is obliquely disposed in such a manner that a hook position where the extension coil spring is hooked to said light amount adjustment member drive member is much further away from said shutter base plate in the optical axis direction than a hook position where the extension coil spring is hooked to said shutter base plate.

8. A light amount adjustment device, comprising:

an actuator having a rotary shaft that forwardly or reversely rotates according to forward or reverse energization of said actuator;

a shutter base plate having an exposure aperture;

shutter blades configured to be rotatably supported by said shutter base plate and configured to open and close the exposure aperture;

a light amount adjustment member configured to be rotatably supported by said shutter base plate and configured to advance to and retreat from the exposure aperture;

a shutter blade drive member having a proximal end to which the rotary shaft of said actuator is fixed and having a tip end provided with a drive shaft extending parallel to the rotary shaft and configured to be engaged with said shutter blades, said shutter blade drive member being configured to rotate with rotation of the rotary shaft of said actuator, thereby rotating said shutter blades in directions to open and close the exposure aperture;

a light amount adjustment member drive member having an engaging portion with which the drive shaft of said shutter blade drive member is slidably engaged, said light amount adjustment member drive member being configured to be slidably engaged with said light amount adjustment member;

an urging member configured to urge said light amount adjustment member drive member in such a manner that said light amount adjustment member retreats from the exposure aperture of said shutter base plate; and first and second abutment portions configured for abutment by said light amount adjustment member drive member that is driven by an urging force of said urging member when the forward energization of said actuator is stopped, wherein said light amount adjustment member retreats from the exposure aperture when said light amount adjustment member drive member is brought in abutment with said first abutment portion, wherein said light amount adjustment member advances to the exposure aperture when said light amount adjustment member drive member is brought in abutment with said second abutment portion, wherein said light amount adjustment member is rotated in a direction to advance to the exposure aperture when the forward energization of said actuator is performed from a state where said light amount adjustment member drive member is in abutment with said first abutment portion, and wherein said light amount adjustment member is rotated in a direction to retreat from the exposure aperture when the forward energization of said actuator is performed from a state where said light amount adjustment member drive member is in abutment with said second abutment portion.

9. A light amount adjustment device, comprising:

an actuator having a rotary shaft that forwardly or reversely rotates according to forward or reverse energization of said actuator;

a shutter base plate having an exposure aperture;

shutter blade configured to be rotatably supported by said shutter base plate and configured to open and close the exposure aperture;

a light amount adjustment member configured to be rotatably supported by said shutter base plate and configured to advance to and retreat from the exposure aperture;

a first drive member having a proximal end to which the rotary shaft of said actuator is fixed and having a tip end provided with a drive shaft extending parallel to the rotary shaft and configured to be engaged with said shutter blade, said first drive member being configured to rotate with rotation of the rotary shaft of said actuator, thereby rotating said shutter blade in directions to open and close the exposure aperture;

a second drive member having an engaging portion with which the drive shaft of said first drive member is slidably engaged, said second drive member being configured to be slidably engaged with said light amount adjustment member;

an urging member configured to urge said second drive member; and a cam portion configured to engage with said second drive member, wherein in a case when the forward energization of said actuator is applied to said actuator, said second drive member is moved against an urging force of said urging member so that an engagement position between said second drive member and said cam portion is changed, whereby said light amount adjustment member advances to the exposure aperture or retreats from the exposure aperture, and wherein in a case when the reverse energization of said actuator is applied to said actuator, said second drive member is moved so that the engagement position between said second drive member and said cam portion is not changed, whereby said shutter blade closes the exposure aperture.

10. The light amount adjustment device according to claim 9, wherein said cam portion is a heart cam groove which is formed on said shutter base plate.

11. The light amount adjustment device according to claim 10, wherein the heart cam groove has three planer cam surfaces having different heights in an optical axis direction and a slanted cam surface through which one of the three planer cam surfaces which has the highest height is connected to another one of the three planer cam surfaces which has the lowest height.

12. The light amount adjustment device according to claim 11, wherein a first position is on the one of the three planer cam surfaces which has the highest height, a fourth position is on the another one of the three planer cam surfaces which has the lowest height, and a second position and a third position are on the last one of the three planer cam surfaces.

13. The light amount adjustment device according to claim 12, wherein there is a first step between the one of the three planer cam surfaces which has the highest height and the last one of the three planer cam surfaces, and there is a second step between the another one of the three planer cam surfaces which has the lowest height and the last one of the three planer cam surfaces.

14. The light amount adjustment device according to claim 9, wherein said urging member is an extension coil spring that is hooked to said second drive member and to said shutter base plate, and the extension coil spring is obliquely disposed in such a manner that a hook position where the extension coil spring is hooked to said second drive member is much further away from said shutter base plate in the optical axis direction than a hook position where the extension coil spring is hooked to said shutter base plate.

\* \* \* \* \*